(12) United States Patent
Gadbois

(10) Patent No.: US 9,835,289 B1
(45) Date of Patent: Dec. 5, 2017

(54) DISPLAY SUPPORT

(71) Applicant: John A. Gadbois, Sioux Falls, SD (US)

(72) Inventor: John A. Gadbois, Sioux Falls, SD (US)

( * ) Notice: Subject to any disclaimer, the term of this patent is extended or adjusted under 35 U.S.C. 154(b) by 0 days.

(21) Appl. No.: 13/856,080

(22) Filed: Apr. 3, 2013

(51) Int. Cl.
*A01K 65/00* (2006.01)
*F16M 13/02* (2006.01)

(52) U.S. Cl.
CPC ................. *F16M 13/022* (2013.01)

(58) Field of Classification Search
CPC ........ A01K 65/00; A01K 97/00; A22C 25/06; A47G 25/32; A47G 25/4038; A47G 25/4061; A47G 25/485; B43L 7/007
USPC ................. 248/490, 100, 340; 223/89, 94; 224/103; 294/143; 33/485, 511; 452/196
See application file for complete search history.

(56) References Cited

U.S. PATENT DOCUMENTS

| 1,210,370 | A | | 12/1916 | Dvorak |
| 1,979,567 | A | | 11/1934 | Nicholson |
| 3,219,241 | A | * | 11/1965 | Newton ........................... 223/94 |
| 3,302,837 | A | * | 2/1967 | Montgomery ................. 224/103 |
| 3,713,188 | A | * | 1/1973 | Holladay ...................... 452/196 |
| 3,727,269 | A | | 4/1973 | Snead |
| 4,090,651 | A | | 5/1978 | Raquel |
| 4,454,630 | A | * | 6/1984 | Shouldis ....................... 452/195 |
| 5,129,154 | A | * | 7/1992 | Aydelott ......................... 33/613 |
| 5,145,098 | A | * | 9/1992 | Tung .............................. 223/94 |
| 5,183,190 | A | * | 2/1993 | Zuckerman .................... 223/96 |
| 6,415,521 | B1 | | 7/2002 | Schnell |
| 7,171,757 | B1 | | 2/2007 | Stoneberg |
| 8,459,514 | B2 | * | 6/2013 | Lagzdins ....................... 223/89 |
| 2002/0100776 | A1 | | 8/2002 | Young |
| 2007/0209219 | A1 | | 9/2007 | Ertmer |
| 2011/0049315 | A1 | | 3/2011 | Buckbee |
| 2012/0324751 | A1 | | 12/2012 | Wakeman |

* cited by examiner

*Primary Examiner* — Bradley Duckworth
(74) *Attorney, Agent, or Firm* — Jeffrey A. Proehl; Woods, Fuller, Shultz & Smith P.C.

(57) ABSTRACT

A display support for supporting objects may comprise at least two elongated support elements connected together and movable between a collapsed storage condition with a relatively reduced overall length and an extended use condition with a relatively increased overall length. At least two hooks may be mounted on the support elements with at least one of the hooks being mounted on each of the support elements such that the hooks are moved toward each other in the collapsed condition and away from each other in the use condition.

1 Claim, 3 Drawing Sheets

DISPLAY SUPPORT

BACKGROUND

Field

The present disclosure relates to display apparatus and more particularly pertains to a new display support for supporting items in a manner that may be highly suitable for photographing the items.

SUMMARY

In one aspect, the disclosure relates to a display support for supporting objects and may comprise at least two elongated support elements connected together and movable between a collapsed storage condition with a relatively reduced overall length and an extended use condition with a relatively increased overall length. The support may also comprise at least two hooks, with at least one of the hooks being mounted on each of the support elements such that the hooks are moved toward each other in the collapsed condition and away from each other in the use condition.

In another aspect, the disclosure relates to a display support for supporting objects which may comprise at least two elongated support elements connected together and movable between a collapsed storage condition with a relatively reduced overall length and an extended use condition with a relatively increased overall length. Each of the elongated elements has an inboard end and an outboard end. The support may also comprise a hinge pivotally connecting the inboard ends of the elongate support elements together, and a lock mechanism mounted on the support elements to releasably lock the elongate elements in the extended use condition. The support may also comprise at least two hooks mounted on each support element such that the hooks are moved toward each other in the collapsed condition and away from each other in the use condition.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
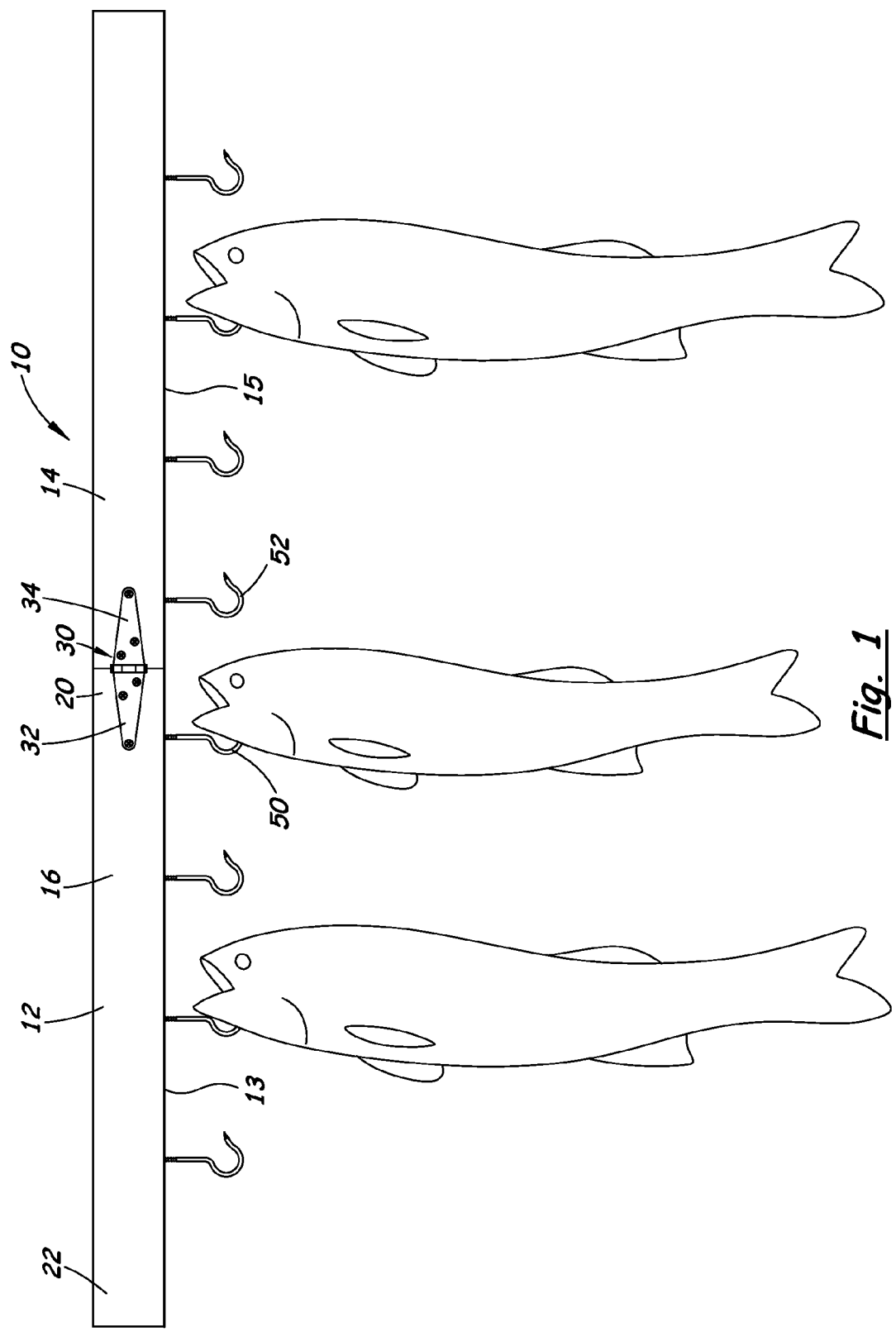
FIG. 1 is a schematic front view of a new display support shown in the extended use condition, according to the present disclosure, with fish shown on some of the hooks.
Figure 2:
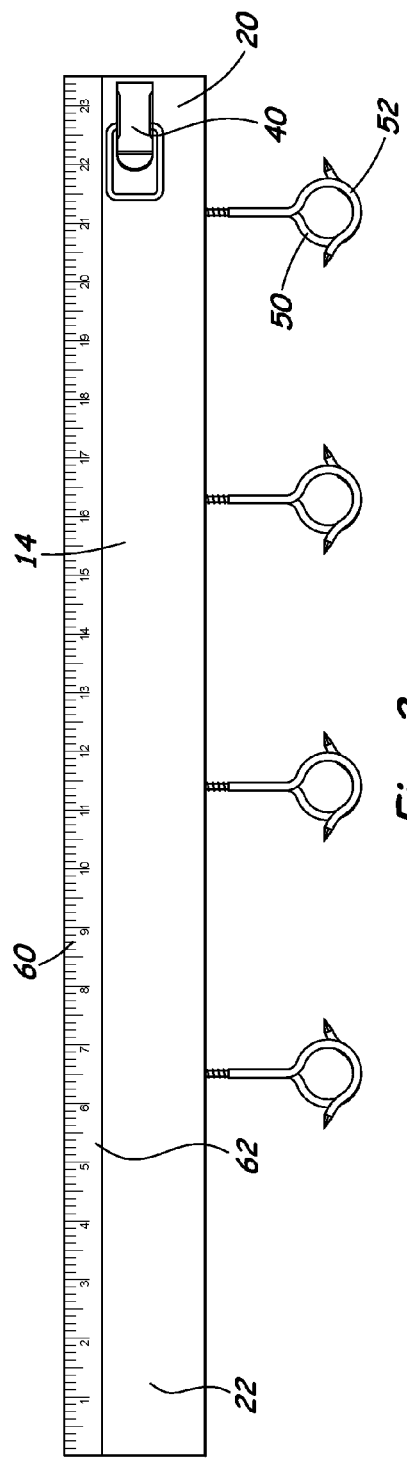
FIG. 2 is a schematic front view of the display support shown in the collapsed storage condition, according to an illustrative embodiment.
Figure 3:
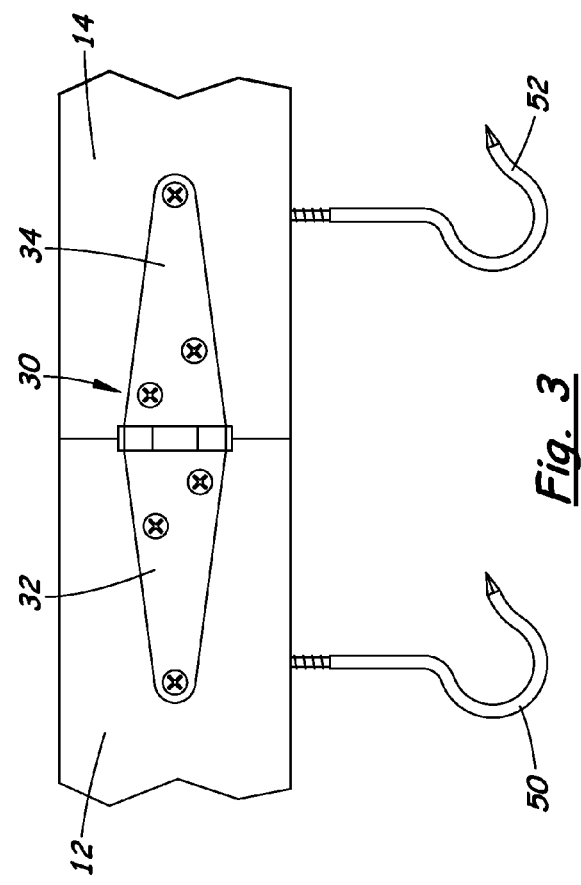
FIG. 3 is a schematic enlarged partial front view of the display support, according to an illustrative embodiment.

With reference now to the drawings, and in particular to FIGS. 1 through 5 thereof, a new display support embodying the principles and concepts of the disclosed subject matter will be described.

The applicant has recognized that it is typical after a day of fishing, hunting, or other activity for a person to want a record of the results of the activity, especially when the results have been good. Often the record is made through photography of the fish or game caught. However, the ability to satisfactorily record the results through photography requires that the fish or game be properly displayed when a photograph is taken, often with the fisher or hunter in the photo. Sometimes the fish or game is suspended from a stringer, which is typically a loose chain with hooks attached. The applicant has recognized that this approach is undesirable as it tends to support the items in a clump that makes it difficult to distinguish one item from the other, and makes it difficult to count the number of items. Further, the items may be suspended at different heights which may make it difficult to appreciate the size of the individual items.

The applicant has further recognized that a highly suitable solution to this problem would support or suspend the items in a manner so that the items are spaced from each other when displayed, so that the items can be visually distinguished from each other in a photograph taken of the item. The applicant has further recognized that a preferable solution would support the items in a fairly uniform manner so that size comparisons may be made. The applicant also recognizes that while it is desirable to have a solution that will support multiple items, the solution should also be portable enough so that photographs may be taken "in the field" prior to cleaning the fish or game, or releasing the fish or game back into the wild.

In one aspect, this disclosure relates to a display support 10 for supporting objects or items, such as fish or game or other quarry, such as in a manner suitable for photographing the fish or game. The support 10 may comprise at least two elongated support elements 12, 14, but may in some embodiments include more than two elements. The support elements 12, 14 may be connected together and may also be movable between a collapsed storage condition (see FIG. 2)

with a relatively reduced overall length for easier transport and storage, and an extended use condition (see FIG. 1) with a relatively increased overall length that is highly suitable for the display function. The elongated support elements 12, 14 may each have a lower edge 13, 15, as well as a front face 16 and a rear face 18. Each of the elongated elements 12, 14 may have an inboard end 20 and an outboard end 22. In some of the most preferred embodiments, the support elements are formed from a substantially rigid material and are thus substantially rigid in form such that the elements are highly resistant to bending. Illustratively, the support elements may be formed of wood, although this material is not critical.

The collapsed condition of the display support 10 may be characterized by the support elements 12, 14 being positioned adjacent to each other and may be in contact with each other. The extended condition of the support 10 may be characterized by the support elements 12, 14 being substantially collinear and aligned with respect to each other from the outboard end 22 of one support element 12 to the outboard end 22 of the other support element 14. In the extended use condition, the inboard ends 20 may be positioned adjacent to each other and may be in contact with each other, and may be connected together. The outboard ends 22 of the support elements may be moved toward each other to achieve the collapsed storage condition and may be moved away from each other in the extended use condition.

The inboard ends 20 of the support elements 12, 14 may be pivotally coupled together to permit the elements to move between the collapsed condition and the expanded condition. In some embodiments, a hinge 30 may connect the respective inboard ends 20 of the elongate elements, and the hinge may be mounted on the front faces 16 of the support elements (see FIG. 3). The hinge 30 may permit movement of the support elements 12, 14 with respect to each other about a pivot axis that extends generally perpendicular to the longitudinal axis of the support elements in the extended condition. A first hinge element 32 may be mounted on the first support element 12 and a second hinge element 34 may be mounted on the second support element 14, and a pivot pin may connect the elements 32, 34.

Figure 4:
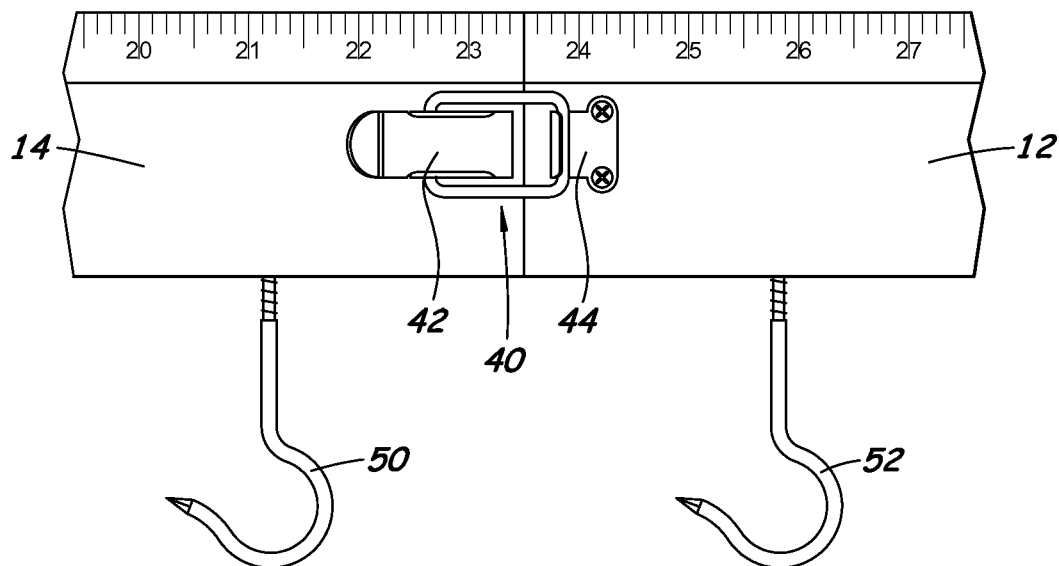
FIG. 4 is a schematic enlarged partial rear view of the display support, according to an illustrative embodiment.
Figure 5:
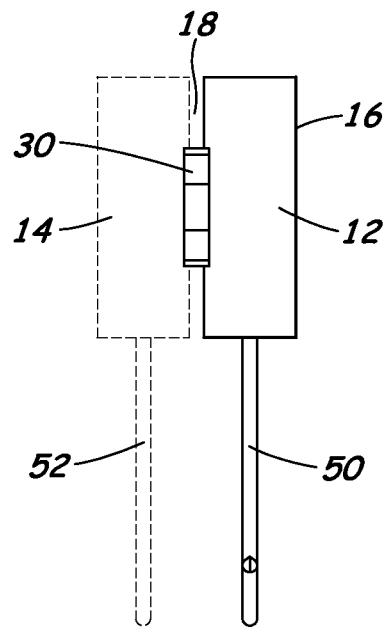
FIG. 5 is a schematic side view of the display support in the extended use condition, with the position of one of the support elements in the collapsed storage condition shown in broken lines.

A lock mechanism 40 may releasably lock the elongate support elements 12, 14 in the extended use condition, and may be releasable to permit the elements to move to the collapsed condition (see FIG. 4). The lock mechanism 32 may be mounted on the respective inboard ends of the support elements, and may be mounted on the rear faces 18 of the respective support elements. The lock mechanism 40 may include a first lock element 42 on the first support element and a second lock element 44 mounted on the second support element.

The display support 10 may also include at least two hooks 50, 52, and at least one of the hooks may be mounted on each support element such that the hooks are moved toward each other in the collapsed condition of the support elements and the hooks are moved away from each other in the expended condition. The hooks 50, 52 may be positioned in a substantially linear arrangement in the extended use condition of the support elements (see FIG. 1). The hooks 50, 52 may be mounted on the lower edges 13, 15 of the storage elements. Each of the hooks may be spaced from at least one adjacent hook, and the hooks may be substantially uniformly spaced along the support elements. In some embodiments, each of the support elements 12, 14 may have at least two hooks, and some embodiments may have three, four or more hooks per support element with suitable extensions of the length of the elements.

Illustratively, the hooks may comprise an overhead or ceiling-style hook which may have a generally J shaped configuration, and may be rigid in character so as not to bend when an item of several pounds or kilograms is being supported by the hook. The hooks may be positioned to have similar orientations on each of the support elements. In some embodiments, the hooks may be positioned on the support elements so that the hooks are positioned adjacent to each other when the support elements are in the collapsed condition, and the adjacent hooks may be oriented opposite to each other so that one of the adjacent hooks tends to close the other of the adjacent hooks, which can help avoid accidental catches of other items on the hooks when in the collapsed condition (see FIG. 2).

The display support may also include a plurality of measurement markings 60 that may be located on at least one of the support elements, and may be located on both of the support elements. In some embodiments, the markings on each support element may be aligned with each other when the support elements are moved into the extended condition. In this way, the markings 60 may extend past the inboard ends of the elements 12, 14. The measurement markings 60 may be marked on a tape 62 that is secured to the support element.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A display support for supporting objects, comprising
at least two elongated support elements connected together and movable between a collapsed storage condition with a relatively reduced overall length and an extended use condition with a relatively increased overall length, each of the elongated elements having an inboard end and an opposite outboard end, each of the elongated support elements having opposite front and rear faces extending between the opposite inboard and outboard ends of the respective said support element, each of the elongated support elements having opposite upper and lower edges extending between the opposite inboard and outboard ends of the respective said support element, the faces of a respective said element having widths measured perpendicular to a longitudinal length of the respective said support element and the edges of a respective said element having widths measured perpendicular to the longitudinal length of the respective said support element, the widths of the edges being narrower than the widths of the faces;

a hinge pivotally connecting the inboard ends of the elongate support elements together, first and second hinge elements of the hinge being mounted on the respective front faces of the support elements;

a lock mechanism mounted on the support elements to releasably lock the elongate support elements in the extended use condition, first and second lock elements of the lock mechanism being mounted on the respective rear faces of the support elements opposite of the elements of the hinge structure mounted on the front faces, the first lock element comprising a hook fixedly mounted on a first one of the support elements and the second lock element comprising a clasp including a release lever pivotally mounted on a second one of the support elements and a loop pivotally mounted on the release lever, the hook being configured to capture a portion of the loop, the lever being configured to pivot in a first direction to apply tension to the loop to pull on the hook and move the support elements into the extended use condition and pivot in a second direction to release tension from the loop to permit the support elements to move into the collapsed storage condition;

at least two hooks mounted on the lower edge of each support element such that the hooks are moved toward each other in the collapsed condition and away from each other in the use condition, each hook having a sharp end; and a plurality of measurement marks on at least one of the support elements, at least two of the measurement marks having a numeral positioned adjacent to the mark to indicate a measurement corresponding to the mark;

wherein a group of the measurement marks is positioned on the front faces of each of the support elements, the group of measurement marks being aligned when the support elements are in the extended use condition and the groups being separated from each other when in the collapsed storage condition, the group of measurement marks being located along the upper edge of the support elements;

wherein the support elements pivot on the hinge about a pivot axis, the at least two hooks each extending from the edge of the support elements along hook axes, the hook axes being parallel to the pivot axis such that application of weight to the hooks does not tend to pivot the support elements on the pivot axis;

wherein the collapsed condition is characterized by the faces of the support elements being positioned adjacent to each other with the outboard ends substantially adjacent to each other, and wherein the extended condition is characterized by the support elements being collinear with respect to each other from the outboard end of one support element to the outboard end of the other support element;

wherein the faces and the outboard ends are moved toward each other in the collapsed storage condition, and the faces and outboard ends are moved away from each other in the extended use condition; and wherein at least one said hook on a first one of the support elements and at least one said hook on a second one of the support elements are moved into aligned and adjacent positions by movement of the support elements into the collapsed storage condition, each hook lying in a plane oriented parallel to the front and rear faces of the support element on which the hook is mounted.

\* \* \* \* \*